(12) United States Patent
   Califorrniaa

(10) Patent No.: US 9,416,026 B2
(45) Date of Patent: Aug. 16, 2016

(54) METHOD OF COLLECTING WATER ON A SPACESHIP TRAVELING IN SPACE

(71) Applicant: Eurica Califorrniaa, Kahuku, HI (US)

(72) Inventor: Eurica Califorrniaa, Kahuku, HI (US)

(*) Notice: Subject to any disclaimer, the term of this patent is extended or adjusted under 35 U.S.C. 154(b) by 0 days.

(21) Appl. No.: 14/746,710

(22) Filed: Jun. 22, 2015

(65) Prior Publication Data
   US 2015/0284261 A1   Oct. 8, 2015

Related U.S. Application Data

(62) Division of application No. 12/848,219, filed on Aug. 1, 2010, now Pat. No. 9,061,235.

(60) Provisional application No. 61/230,728, filed on Aug. 2, 2009.

(51) Int. Cl.
   | | |
   |---|---|
   | *B01D 53/02* | (2006.01) |
   | *C02F 1/00* | (2006.01) |
   | *B01D 53/28* | (2006.01) |
   | *E03B 3/28* | (2006.01) |

(52) U.S. Cl.
   CPC ............. *C02F 1/005* (2013.01); *B01D 53/02* (2013.01); *B01D 53/28* (2013.01); *E03B 3/28* (2013.01); *B01D 2257/80* (2013.01)

(58) Field of Classification Search
   CPC .... B01D 2257/80; B01D 53/02; B01D 53/28; C02F 1/005; E03B 3/28
   See application file for complete search history.

(56) References Cited

U.S. PATENT DOCUMENTS 3,472,681 A * 10/1969 Schuster .............. C04B 41/009
                                                        148/244
2007/0256928 A1* 11/2007 Sutton ................ C23C 14/0682
                                                       204/192.15

OTHER PUBLICATIONS

Hendrix et al., "The lunar far-UV albedo: Indicator of hydration and weathering," Journal of Geophysical Research: Planets, vol. 117, No. E12, E12001, 2012.
Califorrniaa, "Influence of the lunar ambience on dynamic surface hydration on sunlit regions of the Moon," Advances in Space Research, vol. 55, No. 6, Mar. 15, 2015 (online Jan. 2, 2015), pp. 1705-1709.
Livengood et al., "Moonshine: Diurnally varying hydration through natural distillation on the Moon, detected by the Lunar Exploration Neutron Detector (LEND)," Icarus, vol. 255, Jul. 15, 2015 (online Apr. 18, 2015), pp. 100-115.
Boyle, "Sunlight could whip up water to slake lunar settlers' thirst," New Scientist, Daily News, Jun. 9, 2015, https://www.newscientist.com/article/dn27688-sunlight-could-whip-up-water-to-slake-lunar-settlers-thirst (accessed Aug. 17, 2015).
Wang et al., "An unprecedented constraint on water content in the sunlit lunar exosphere seen by Lunar-based Ultraviolet Telescope of Chang'e-3 mission," Planetary and Space Science, vol. 109, May 2015 (online Mar. 6, 2015), pp. 123-128.

(Continued)

*Primary Examiner* — Christopher P Jones
(74) *Attorney, Agent, or Firm* — Boies, Schiller & Flexner LLP

(57) ABSTRACT

To collect water in space, a surface of a spaceship facing a direction of travel is coated with a drying agent, nanocoating, or nanostructures which are suitable for use in high vacuum to capture ambient water moisture from space as it impinges on the spaceship.

7 Claims, 4 Drawing Sheets

Earth and Moon Orbits

(56) References Cited

OTHER PUBLICATIONS

Sridharan et al., "Corrigendum to "The Sunlit lunar atmosphere: A Comprehensive study by CHACE on the Moon Impact Probe of Chandrayaan-1" [Planet. Space Sci. 58 (2010) 1567-1577]," Planetary and Space Science, vol. 111, Jun. 2015 (online Dec. 31, 2014), pp. 167-168.

McClanahan et al., "Evidence for the sequestration of hydrogen-bearing volatiles towards the Moon's southern pole-facing slopes," Icarus, vol. 255, Jul. 15, 2015 (online Oct. 19, 2014), pp. 88-99.

Benna et al., "Metallic ions in the upper atmosphere of Mars from the passage of comet C/2013 A1 (Siding Spring)," Geophysical Research Letters, vol. 42, No. 12, Jun. 28, 2015 (online Jun. 16, 2015), pp. 4670-4675.

Yelle et al., "Perturbation of the Mars atmosphere by the near-collision with Comet C/2013 A1 (Siding Spring)," Icarus, vol. 237, Jul. 15, 2014 (online May 2, 2014), pp. 202-210.

Benna et al., "Variability of helium, neon, and argon in the lunar exosphere as observed by the LADEE NMS instrument," Geophysical Research Letters, vol. 42, No. 10, May 28, 2015 (online May 7, 2015), pp. 3723-3729.

Benna et al., "Observations of meteoroidal water in the lunar exosphere by the LADEE NMS instrument," 2015 Annual Meeting of the Lunar Exploration Analysis Group, Oct. 20-22, 2015 (Columbia, Maryland), Session 201 (Oct. 21, 2015), Abstract No. 2059.

Ojha et al., "Spectral evidence for hydrated salts in seasonal brine flows on Mars," European Planetary Science Congress Abstracts, vol. 10, EPSC2015-838-1, 2015.

Edmund Optics Inc. (Barrington, NJ), "Germanium Plano Convex (PCX) Lenses," http://www.edmundoptics.com/optics/optical-lenses/plano-convex-pcx-spherical-singlet-lenses/germanium-plano-convex-pcx-lenses/3361/?print=Pdf (accessed Mar. 24, 2016).

Bhardwaj et al., "On the Evening Time Exosphere of Mars: Result from MENCA aboard Mars Orbiter Mission," Geophysical Research Letters, 2016 (In Press), http://dx.doi.org/10.1002/2016GL067707 (accessed Mar. 24, 2016).

Bhardwaj et al., "MENCA Experiment aboard India's Mars Orbiter Mission," Current Science, vol. 109, No. 6, Sep. 25, 2015, http://www.currentscience.ac.in/Volumes/109/06/1106.pdf (accessed Mar. 24, 2016).

Ahmed, "MENCA Brings Divine Wealth from Mars: First Science Results from the Mars Orbiter Mission," The Planetary Society, Guest Blogs, Mar. 2, 2016, http://www.planetary.org/blogs/guest-blogs/2016/0225-menca-brings-divine-wealth.html (accessed Mar. 24, 2016).

Wikipedia (Hydrophobic silica), https://en.wikipedia.org/wiki/Hydrophobic_silica (accessed Mar. 10, 2016).

César-Auguste et al., "An Investigation of Germanium Coated Black Kapton and Upilex Films under Different Environmental Ground Conditions," 11th International Symposium on Materials in a Space Environment, Sep. 15-18, 2009 (Aix-en-Provence, France), http://esmat.esa.int/materials_news/isme09/pdf/3-Ground/Poster%20Groung%20Testing%20-%20Cesar-Auguste.pdf (accessed Mar. 3, 2016).

Sheldahl, "Product Bulletin—Germanium Coated Polyimide," In: The Redbook, Multek Corporation (Northfield, MN), pp. 69-70, http://www.sheldahl.com/documents/RedBook.pdf (accessed Mar. 18, 2016).

Sheldahl, "Thermal Control Overview," In: The Redbook, Multek Corporation (Northfield, MN), pp. 7-16, http://www.sheldahl.com/documents/RedBook.pdf (accessed Mar. 18, 2016).

\* cited by examiner

Earth and Moon Orbits

Rocket Delivers Magnesium Chloride to Moon

Magnesium Chloride Deposited on Lunar Surface

Magnesium Chloride Collects Water from Space

Water Soluble Salt Located Near Lunar Surface

Surface Seeded with Deliquescent Substance

Surface Collects Solar Moisture

Surface Water Leaches Salt Underneath

Source: Grayscale conversion of data from the NASA-built
Moon Mineralogy Mapper (M3) carried by Chandrayaan-1

Crater Wetness Follows Shadow Pattern

US 9,416,026 B2

METHOD OF COLLECTING WATER ON A SPACESHIP TRAVELING IN SPACE

PROPERTY RIGHTS STATEMENT TO NASA

The invention was not made under nor is there any relationship of the invention to the performance of any work under any contract of the National Aeronautics and Space Administration (NASA).

BACKGROUND OF THE INVENTION

1. Field of the Invention

My invention relates to a method of collecting water on the Moon. This divisional of my invention relates more specifically to a method of collecting water on a spaceship traveling in space.

2. Prior Art

The prior art teaches that water must be brought to the Moon in the form of bulk parcels, e.g., manually by spacecraft or celestially by comet, or that conversion of lunar matter into water is required, e.g., by combination of hydrogen and oxygen after evolution from lunar matter.

3. Statement of the Necessity

The uses of water are well known. In order to further lunar development, a large supply of water is desirable on the Moon.

But bringing water to the Moon manually by spacecraft is impractical in large quantities due to the weight of water and the cost of space travel from Earth to the Moon. Relying on comets to bring water to the Moon is impractical due to the rarity and unpredictability of comets. Conversion of lunar matter into water requires specialized chemical and mineral processing equipment, and, depending on the conversion method, large amounts of energy may be required.

In contrast to the limitations imposed by prior art methodologies, it would be desirable to have a means of supplying water to the Moon that does not require water parcel delivery or conversion of lunar matter into water.

What is needed is a method of collecting water on the Moon.

BRIEF SUMMARY OF THE INVENTION

My invention satisfies the above-stated needs.

In a preferred embodiment, the invention comprises depositing a deliquescent substance such as magnesium chloride ($MgCl_2$) on a surface of the Moon to collect ambient moisture from outer space.

BRIEF DESCRIPTION OF THE SEVERAL VIEWS OF THE DRAWING

FIG. 2C is most descriptive of the invention.

DETAILED DESCRIPTION OF THE INVENTION

Figure 1:
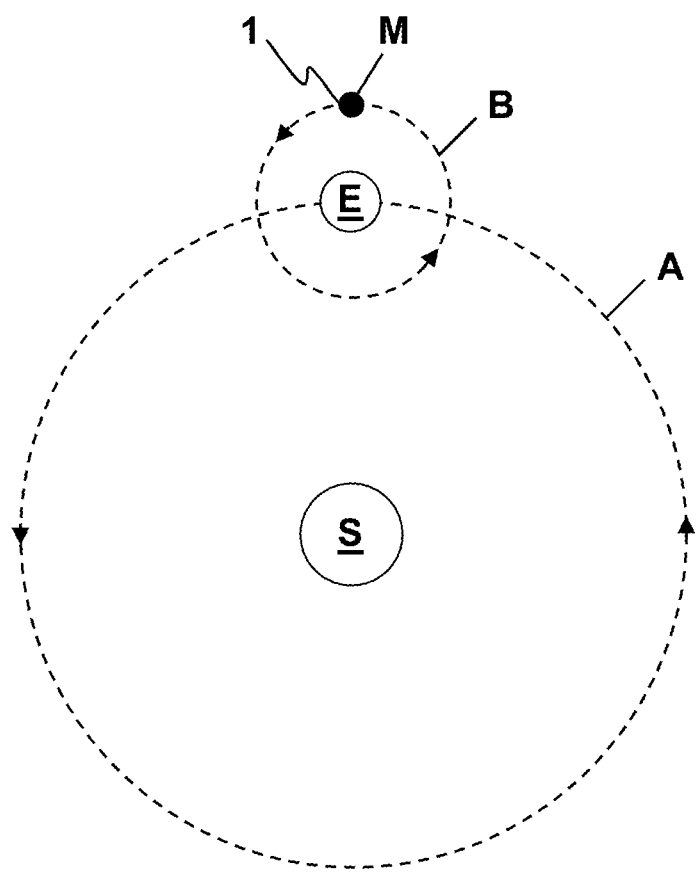
FIG. 1 is a diagram of Earth and Moon orbits.

My invention is a method of collecting water on the Moon. The invention may be appreciated in view of a theory of operation.

1. Theory of Operation

In this disclosure, the Earth is classified as a tropical planet (or, to borrow from the Köppen climate classification system, a tropical rain forest planet). As an example of contrast, Mars is classified as a semitropical planet (or, to borrow from the Köppen climate classification system, a tropical wet and dry or savanna planet). The basis for these distinctions is that outer space contains a faint quantity of moisture, called solar moisture. Earth orbits in a tropical (rain forest) region of solar moisture. This means that in relative terms the Earth is always in a "wet" region of space. In contrast, Mars orbits in a semitropical region of space. Over geologic time, this means Mars experiences "wet" and "dry" seasons. In other words, the pattern of solar moisture shifts seasonally—meaning, over geologic time—and right now Mars is in its "dry" season.

Even though solar moisture is extremely faint, the Earth sweeps out an immense toroidal volume in its yearly journey around the Sun. In doing so, the Earth acts like a big catcher's mitt, sweeping out solar moisture in its orbital path. A state of equilibrium called hydrostasis is achieved when an amount of solar moisture encountered equals an amount of moisture escaping from Earth. Over geologic time, seasonal variations in equilibrium occur. In other words, the Earth's moisture content is not a fixed value, but depends on a contrast between the moisture content of space encountered in the Earth's orbital path and the amount of moisture escaping from the Earth. Importantly, in addition to gravity, salt helps the Earth to retain its moisture.

In this disclosure, the term "geopooling" (geo-pooling) is coined to mean the process by which a celestial body forms a body of water from collected solar moisture. To explain this process, first a deliquescent substance (e.g., magnesium chloride, $MgCl_2$) collects solar moisture and forms a pool of water on the surface. Although substances that can bind water that are not deliquescent can collect water, an ability to form a pool of water is necessary so that fluidic communication can be established with a salt deposit consisting of a water soluble salt (e.g., sodium chloride, NaCl). Accordingly, the pool of water leaches salt from the deposit by dissolution. Salt plays two roles in geopooling. As a deliquescent substance (e.g., $MgCl_2$), salt initiates the collection of solar moisture. As an abundant and highly soluble substance (e.g., NaCl), salt dissolves into the water and lowers the vapor pressure. This is why the sea has salt in it. For if it was not for having salt, the Earth would not be able to retain its water.

Once geopooling is initiated, the water content of the celestial body will increase until hydrostasis is achieved. Over geologic time, the water content will fluctuate based on equilibrium considerations, particularly variations in solar wetness. With respect to variations in solar wetness, the Earth orbits in a tropical region of space. The tropical solar wetness enables the Earth to constantly maintain a large body of water, unlike Mars, which periodically "dries out" in a semitropical orbit.

The invention may be appreciated as a discovery of the principles of nature governing the Earth's hydrostasis, as described above, combined with an inventive application of this discovery to the watering of the Moon, as described below.

The Moon orbits in substantially the same tropical region of solar wetness as the Earth. But the Moon is unable to initiate geopooling on its own due to salt deficiencies. It is this problem, more so than a difference in gravity, that explains why the Moon remains substantially dry, in contrast to the Earth. The invention solves this "dryness" problem by means of depositing a deliquescent substance having predetermined deliquescent properties on a surface of the Moon to collect ambient moisture from outer space. An exemplary deliquescent substance is magnesium chloride ($MgCl_2$). The collected water can then be desalinated or used in saline form.

2. Preferred Embodiment

Substances that readily absorb ambient water moisture from a surrounding environment are called hygroscopic, also known as drying agents or desiccants. A deliquescent substance is one that not only absorbs water from the surroundings (i.e., is hygroscopic) but also dissolves into the absorbed water to form a pool.

Some drying agents work to remove water by hydration and others work by chemical conversion. Some drying agents are not only hygroscopic but are also deliquescent. A large number of drying agents are known to chemists that are able to remove ambient water in a high vacuum environment. A large number of deliquescent substances are also known to chemists. The invention is not limited to a particular deliquescent substance, hygroscopic substance, drying agent, or desiccant. Candidate substances may be selected for various chemical and physical properties, such as binding affinity for water, usefulness in high vacuum, saltwater vapor pressure, solubility in water, light weight (for transport), non-toxicity, and ease of desalination.

For the purposes of the preferred embodiment, magnesium chloride ($MgCl_2$) is a preferred deliquescent substance. Calcium chloride ($CaCl_2$), lithium chloride (LiCl), and magnesium perchlorate $Mg(ClO_4)_2$ are notable alternatives, among many others. Although these substances exhibit their deliquescent properties in hydrated forms, anhydrous forms also bind the water of hydration.

Substances such as magnesium chloride, calcium chloride, and lithium chloride, that give up water reversibly, are preferable from the perspective of ease of regeneration (e.g., by reverse osmosis) compared to substances such as phosphorous pentoxide ($P_2O_5$) or barium oxide (BaO), that undergo chemical transformation when binding water; either type may be advantageously employed to collect some amount of water. Hygroscopic substances that are insoluble or poorly soluble in water, e.g., calcium sulfate ($CaSO_4$), are also notable.

According to the invention, a mixture may be made of any combination of a hygroscopic substance, deliquescent substance, and water soluble salt. Mixtures of highly soluble salts (e.g., NaCl) and deliquescent substances are preferred.

A table compiled by John H. Yoe lists "Drying agents depending upon chemical action (absorption) for their efficiency"; he also lists "Drying agents depending upon physical action (adsorption) for their efficiency"; he also notes that "the efficiency of some drying agents . . . depends upon both adsorption and absorption." Yoe, J. H., "Efficiency of Drying Agents," Handbook of Chemistry and Physics, 72nd ed., Boca Raton, Fla.: CRC Press, 1991, p. 15-22.

FIG. 1 shows the Earth E in orbit A around the Sun S, and the Moon M in orbit B around the Earth E. Referring to FIG. 1, a preferred lunar site for depositing the magnesium chloride on the surface of the Moon is found on a surface of the Moon facing the Moon's trajectory, called the Moon's trajectory face 1. Although other surfaces of the Moon may be advantageously selected, a particular advantage of depositing the preferred deliquescent substance on the Moon's trajectory face 1 is that this surface faces forward in the direction of the Moon's course in orbit as the Moon encounters solar moisture from outer space (as the Moon M travels its orbital path B). In other words, the trajectory face serves as the palm side of a catcher's mitt formed by the Moon as it sweeps out a toroidal volume along its orbital path. In effect, depositing the preferred deliquescent substance on the surface of the Moon enables the encountered solar moisture to stick to the glove, meaning, to the surface of the Moon.

Figure 2A:
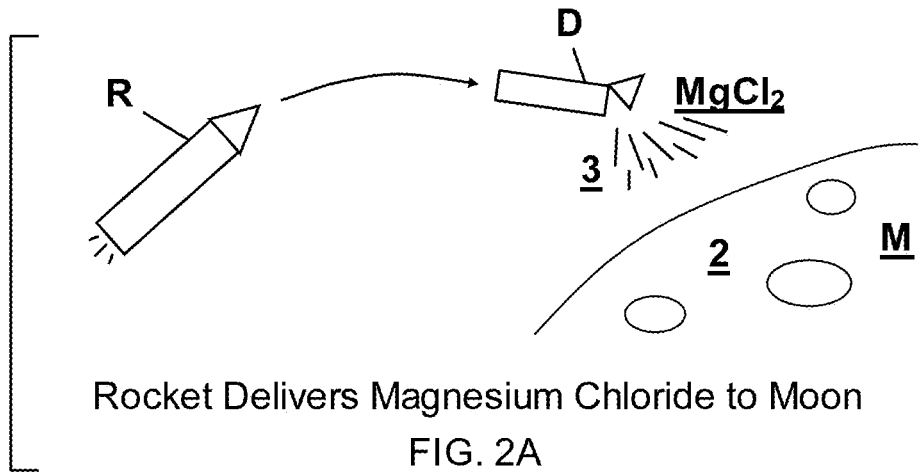
FIGS. 2A-C are perspective views of collecting water on the Moon according to the invention.

Referring to FIG. 2A, a preferred means of depositing the preferred deliquescent substance $MgCl_2$ on a preselected surface 2 of the Moon M is by rocket R. Delivery of the preferred deliquescent substance $MgCl_2$ to the surface 2 of the Moon M by rocket R is completed by any means of distributing the preferred deliquescent substance $MgCl_2$ on the preselected surface 2. Referring to FIG. 2A, an exemplary means of distribution is by detonating the rocket R over the surface 2 of the Moon M, so that the detonated rocket D emits a shower 3 of the preferred deliquescent substance $MgCl_2$ onto the preselected surface 2 of the Moon M. Other means include rocket impact, robotic distribution, and manual distribution by astronauts after landing on the Moon M.

Figure 2B:
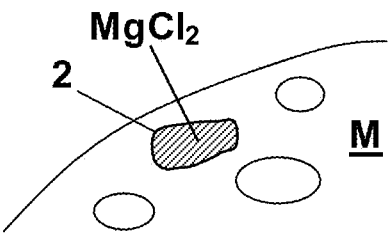
Figure 2C:
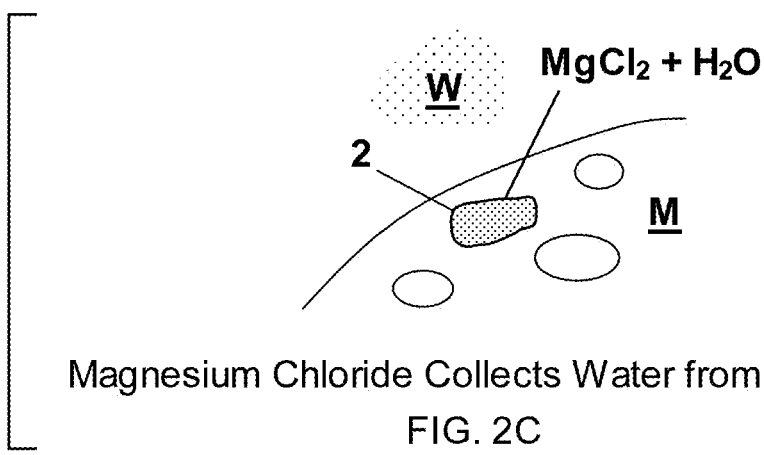

Referring to FIG. 2B, the preferred deliquescent substance $MgCl_2$ is shown distributed on the preselected surface 2 of the Moon M. Referring to FIG. 2C, according to the invention's theory of operation as described above, the preferred deliquescent substance $MgCl_2$ waters the Moon M by collecting solar moisture W from outer space and forming a pool of saltwater $MgCl_2+H_2O$ on the surface 2 of the Moon M.

3. Geopooling on the Moon

In theory, an ocean of water on the Moon could support an Earth-like atmosphere and temperature on the Moon by retaining dissolved gasses. It would be impractical, however, to transport an ocean's worth of salt to the Moon in order to collect and retain a lunar ocean.

Though presenting an alternative to transport, mining a preferred deliquescent substance on the Moon or forming it chemically from lunar matter would not be practical on an oceanic scale.

Figure 3A:
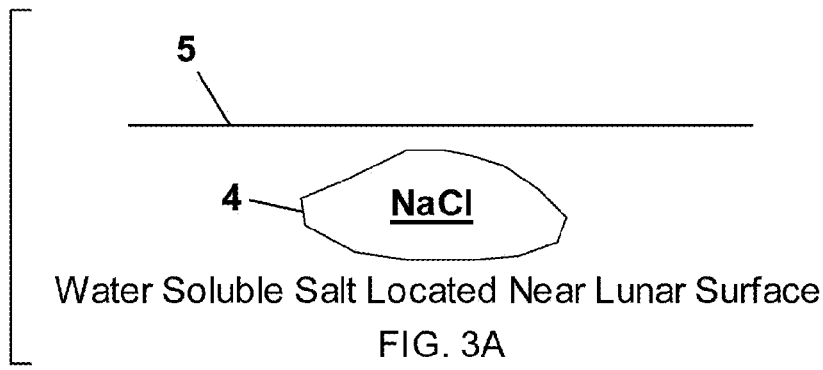
FIGS. 3A-D are side cross-sectional views showing a process of geopooling taking place on the Moon according to the invention.
Figure 3B:
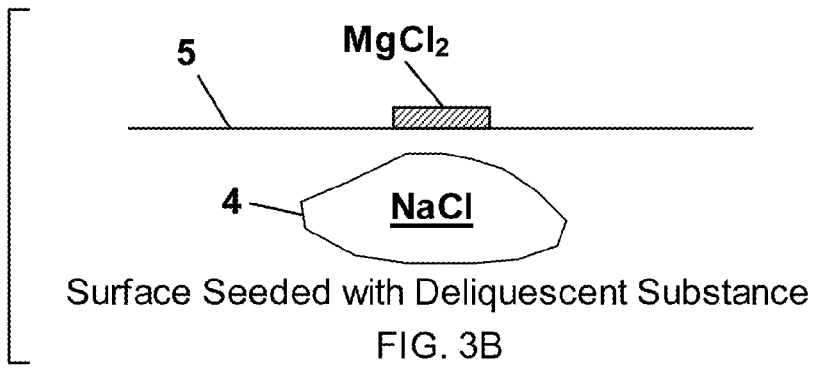
Figure 3C:
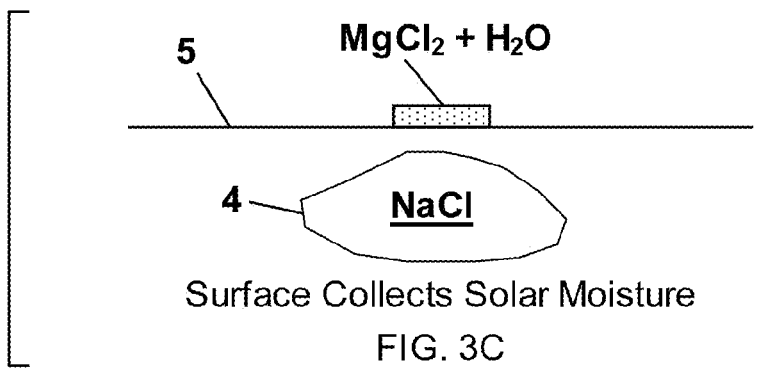
Figure 3D:
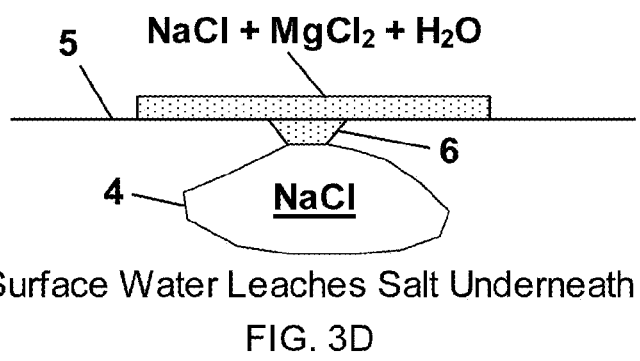

To overcome this limitation in ocean formation, the principle of geopooling may be employed advantageously. Referring to FIG. 3A, a lunar salt deposit 4 of a water soluble salt (e.g., NaCl) is located geologically near the surface 5. Referring to FIG. 3B, a deliquescent substance (e.g., $MgCl_2$) is deposited on the surface 5 above the lunar salt deposit 4. Referring to FIG. 3C, the deliquescent substance collects solar moisture from outer space, forming a small pool of saltwater (e.g., $MgCl_2+H_2O$) on the surface 5. Referring to FIG. 3D, fluidic communication 6 is established between the pool of saltwater on the surface 5 and the lunar salt deposit 4 underneath. Fluidic communication 6 can be established by means of digging, drilling, blasting, pumping, or by seepage of surface water. As a consequence of fluidic communication 6, a larger pool of water ("ocean") (e.g., $NaCl+MgCl_2+H_2O$) is formed as fluid on the surface 5 leaches salt from the lunar salt deposit 4 underneath. The growing pool will continue to collect more and more ambient water from outer space until hydrostasis is achieved.

4. Other Considerations

In order for a deliquescent salt to optimally collect solar moisture from outer space on a surface of the Moon, it is preferable that the surface temperature should not exceed the boiling point of the saltwater. For geopooling, it is also preferable that the pool temperature should not fall below the freezing point. For this reason, it is preferable to locate a lunar surface such that temperatures will fall within predetermined ranges during the collection of solar moisture. Another alternative is to employ a shelter, insulation, heat sink, or heat source to guard against extremes of temperature.

A saltwater liquid of low vapor pressure is desirable for optimal collection of ambient solar moisture. It is therefore preferable to maintain a high concentration of salt to maintain a low vapor pressure. In other words, as a pool of water is collected, keeping the pool salty helps to maintain a low vapor pressure. According to Raoult's law, the vapor pressure of water decreases as the number of salt ion molecules dissolved in the water increases; the freezing point of the water also decreases, and the boiling point increases. Salt is excluded when water freezes or boils.

According to the invention, a deliquescent substance functions to initiate water collection, with formation of a pool of water. However, once a pool or atmosphere is formed, these too will collect solar moisture as long as outer space is wet enough. For this reason, depositing saltwater on the lunar surface will also aid in moisture collection. But saltwater having a high concentration of a deliquescent substance may advantageously have a lower vapor pressure than observed for other solutes and than predicted for an ideal solution by Raoult's law; a low vapor pressure is advantageous in initially collecting a net amount of solar moisture from outer space, when the atmospheric vapor pressure is lowest. In view of the invention, it will be a matter of ordinary skill for one skilled in the art of physical chemistry to select candidate substances based on their saltwater vapor pressure at lunar temperatures at given concentrations.

The efficiency of candidate substances can be tested by one of ordinary skill in view of the invention by measuring the efficiency of water collection, including with the aid of monitoring sensors placed on the Moon. Sensors on the Moon can also be employed to detect locations on the lunar surface encountering a greater flux of solar moisture. It will be obvious to one of ordinary skill to try various mixtures and preparations of substances for their water-collecting ability in view of the invention. For example, it is found that calcium chloride has a greater efficiency as a drying agent when prepared in fused form compared to in granular form. See Yoe, J. H., ibid. Therefore, it will be obvious to one of ordinary skill to try various preparations and to test them for their efficiency.

As water is collected, stirring, agitation, and convection are advantageous to maintain a high surface concentration of salt to promote further collection.

Desalinated water can be stored in a reservoir and the deliquescent substance reused to collect more water from outer space. In this manner a small quantity of deliquescent substance transported to the Moon can be used over and over again to collect a relatively large amount of water.

Moisture sensors, whether placed on celestial bodies or in orbit, can be used to collect meteorological data concerning solar moisture.

5. Comparison to NASA's Theory

NASA teaches that billions of years ago water-bearing comets and asteroids pummeled the Earth and Moon, leaving an abundance of water, but that the Moon did not retain water as the Earth did, due to a weaker gravity. Today, some scientists believe remnants of water delivered to the Moon in this fashion may remain in shadowy recesses at the poles of the Moon, where it is freezing cold and the Sun's light does not shine.

In contrast, the theory of the invention is that the Earth's water is maintained in relation to an ambient process of hydrostasis with respect to solar moisture in the Earth's orbital path. Importantly, unlike the theory adopted by NASA, this theory relies on principles of equilibrium to explain the Earth's water balance. Similarly, with regard to the speculation that ice may be present in polar recesses on the Moon, the present teaching is more likely to attribute the possibility of such ice to a solid state condensation of solar moisture, based on equilibrium principles, rather than to delivery by comets.

6. Other Embodiments

The invention is titled a method of collecting water on the Moon to emphasize the preferred embodiment. But a more general title for the invention is a method of wetting a space bound body with ambient moisture from outer space. Exemplary bodies include celestial bodies, spacecraft, and artificial satellites. Importantly, the invention is not limited to a use of deliquescent substances to effectuate a wetting of the body.

For example, one skilled in the art of nanotechnology will appreciate that surfaces of a body may be coated with a nanocoating or nanostructures to collect solar moisture encountered in the body's path when traveling through space. The surfaces are preferably oriented in the direction of travel. Additionally, one skilled in the art of microfluidics will appreciate that microfluidics can be integrated with nanotechnology to channel amounts of collected moisture to reservoirs.

7. Note on Related Art

According to Wikipedia (Interstellar travel): "In 1960 Robert W. Bussard proposed the Bussard ramjet, in which a huge scoop would collect the diffuse hydrogen in interstellar space, "burn" it using a proton-proton fusion reaction, and expel it out of the back." The Bussard ramjet is related in that it teaches a catcher's mitt type collection of an ambient molecule from outer space, in this case hydrogen. Known as a "ram scoop," the mitt in this case is formed by an electromagnetic field.

According to Lunarpedia (Lunar Temperature): "At the lunar poles there are believed to be regions which never receive direct sunlight. If they don't receive significant warming from higher elevation surfaces that are in direct sunlight, they would be equilibrated only with the thermal background radiation of deep space at 2-3 K (−270 degrees C.), and would likely form cold traps holding volatile materials."

8. New Developments

New reports since the filing of the provisional application are consistent with the theory of the invention. See Pieters et al., "Character and Spatial Distribution of $OH/H_2O$ on the Surface of the Moon seen by $M^3$ on Chandrayaan-1," Science, 23 Oct. 2009, Vol. 326, No. 5952, pp. 568-572 (first announced 24 Sep. 2009). The invention is not obvious in view of such reports because they only provide retrospective insight into the surprising ingenuity of the invention. See also Califorrniaa, "Method of watering the Moon," U.S. application Ser. No. 61/085,420, filed Aug. 1, 2008.

Figure 4:
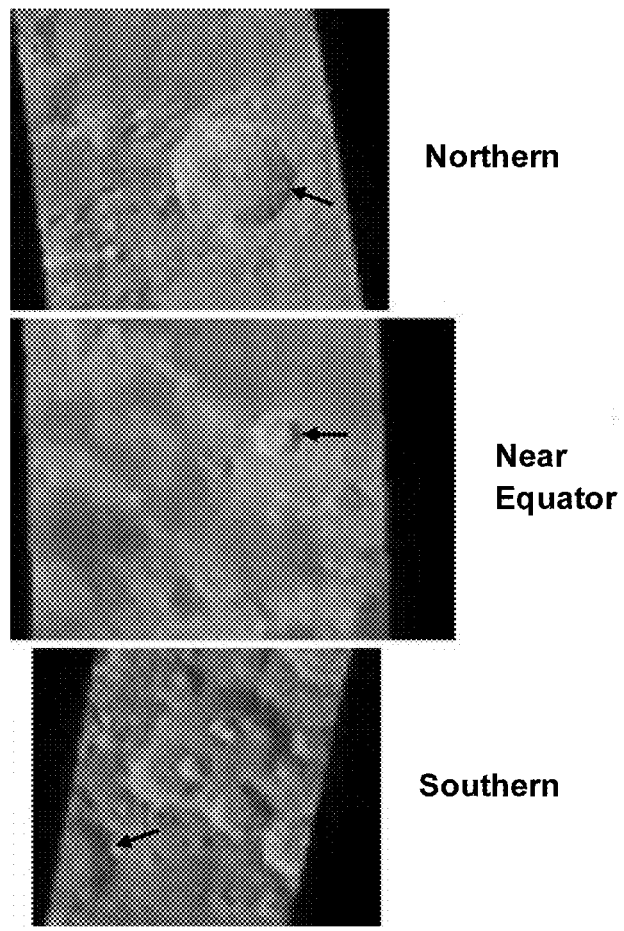
FIG. 4 is a series of satellite images showing a crescent-shaped pattern of surface water detected in craters on the sunlit surface of the Moon.

India's Chandrayaan-1 space probe brought back evidence confirming that the entire surface of the Moon is orders of magnitude wetter than indicated by samples presented by U.S. Apollo and Soviet Luna missions. FIG. 4 shows a grayscale conversion of data from the probe's NASA-built Moon Mineralogy Mapper ($M^3$) indicating surface water on the Moon. Shown are images taken along longitude 15 degrees east. Assuming the Sun is rising in the east, arrows indicate a direction of sunlight shining upon selected craters. Crescent-shaped dark areas within the selected craters indicate a greater content of surface water than light shaded areas. Importantly, note that respective orientations of the crescent-shaped dark areas are consistent with shadowing in sunlight by crater walls as the Sun rises in the east. Namely, a southeast portion is shaded in the interior of a northern crater; an eastern portion is shaded in an equatorial crater; and, a northeastern portion is shaded in a southern crater.

Consistent with the theory of the present invention, an interpretation of this data is that sunlight from the Sun rising in the east has caused water trapped in the soil to evaporate, except in shadowed regions cast by crater walls. According to the theory of the present invention, the Moon is constantly bombarded by solar moisture in its path. This allows the Moon to constantly collect solar moisture at its surface. But the Moon does not retain the moisture on an oceanic scale. Instead, the water evaporates each day where the Sun shines its heat. Referring to the selected craters shown in FIG. 4, a contrast between dark and light shaded areas indicates a substantial difference in surface water content. Importantly, this would imply that the Moon collects an amount of solar moisture equal to at least the indicated difference in the course of each lunar day.

Recent data also confirms that water ice is present at the polar regions of the Moon. It has been suggested that a mining of polar ice could supply water to non-polar stations on the Moon. A disadvantage of this method is that it involves the expense of transport back and forth. Another disadvantage is that the heat of the Sun cannot be used in polar regions to aid in an extraction of water from the lunar soil.

In contrast, a tremendous advantage of the present invention is that it enables solar moisture to be collected in situ on the surface of the Moon using a collecting means. An exemplary collecting means comprises a deliquescent substance or other drying agent. Though not as good at collecting moisture as some drying agents, lunar regolith serves as an abundant and inexpensive drying agent compared to deliquescent or hygroscopic salts brought from Earth. Water collected by the deliquescent substance or other drying agent in a lunar night or low sun can be diurnally released as water vapor for containment using solar heating in a lunar day. The released vapor can be trapped or housed by a nominal containment means (e.g., tubes) to trap or pressurize the vapor. Pressurized vapor can be used for steam power to generate electricity by means of a steam turbine. The steam can be vented into space or recaptured. The steam can be cooled by transfer to a cooling means to produce cooled vapor or liquid water. The cooling means can be provided by lunar soil at a predetermined depth or in shadows.

The invention provides a method of obtaining water on the Moon, comprising collecting solar moisture in situ. In an exemplary embodiment, the step of collecting includes means of a deliquescent substance having predetermined deliquescent properties to capture the solar moisture in situ.

What is claimed is:

1. A method of collecting water on a spaceship traveling in space, comprising: coating an exterior surface of the spaceship with a drying agent, nanocoating, or nanostructures having predetermined drying properties to collect ambient water moisture from space.

2. The method of claim 1, wherein the coated exterior surface faces a direction of spaceship travel.

3. A method of collecting water on a spaceship traveling in space, comprising:
   (a) coating an exterior surface of the spaceship with a drying agent, nanocoating, or nanostructures having predetermined drying properties to collect ambient water moisture from space;
   (b) capturing by means of the drying agent, nanocoating, or nanostructures a flux of ambient water moisture being encountered at the coated exterior surface from surrounding space; and,
   (c) exploiting the drying agent, nanocoating, or nanostructures as a resource of the water captured in step (b).

4. The method of claim 3, wherein the coated exterior surface faces a direction of spaceship travel.

5. A method of obtaining water on a spaceship traveling in space, comprising: on an exterior surface of the spaceship disposed with a drying capacity to collect ambient water moisture from the void of outer space,
   (a) collecting the ambient water moisture;
   (b) harvesting the collected water;
   (c) restoring the drying capacity for repetitious collection; and,
   (d) on the restored exterior surface, repeating at least the collecting and harvesting; whereby water is obtained on the spaceship as a renewable resource.

6. The method of claim 5, wherein said exterior surface is disposed with said drying capacity by means of one or more drying agents, nanocoatings, or nanostructures having predetermined drying properties to collect said ambient water moisture.

7. The method of claim 6, wherein said exterior surface faces a flux of said ambient water moisture being encountered from said void of outer space in a direction of spaceship travel.

* * * * *